United States Patent [19]

Morita et al.

[11] Patent Number: 5,576,117
[45] Date of Patent: Nov. 19, 1996

[54] FLAT-TYPE CELL

[75] Inventors: Yoshinobu Morita, Hirakata; Fumio Daio, Kitakatsuragi-gun; Norimasa Takahashi, Neyagawa; Kenichi Nakatsu, Mishima-gun; Naoko Souma, Katano, all of Japan

[73] Assignee: Matsushita Electric Industrial Co., Ltd., Osaka, Japan

[21] Appl. No.: 611,684

[22] Filed: Mar. 6, 1996

[30] Foreign Application Priority Data

| Mar. 7, 1995 | [JP] | Japan | 7-046964 |
| Jul. 31, 1995 | [JP] | Japan | 7-194562 |
| Sep. 21, 1995 | [JP] | Japan | 7-242888 |

[51] Int. Cl.⁶ .................................................. H01M 2/08
[52] U.S. Cl. ........................ 429/162; 429/172; 429/174
[58] Field of Search ............................ 429/162, 163, 429/171, 172, 174, 185

[56] References Cited

U.S. PATENT DOCUMENTS

| 4,374,909 | 2/1983 | Tucholski | 429/174 |
| 4,401,733 | 8/1983 | Shirai et al. | 429/174 |
| 4,407,914 | 10/1983 | Inoue et al. | 429/174 |
| 4,419,420 | 12/1983 | Ishizaki | 429/185 |

FOREIGN PATENT DOCUMENTS

| 0058088 | 8/1982 | European Pat. Off. . |
| 1-86443 | 3/1989 | Japan . |

*Primary Examiner*—Anthony Skapars
*Attorney, Agent, or Firm*—Ratner & Prestia

[57] ABSTRACT

A flat-type cell comprising cup shaped positive and negative electrode cases, each having a cylindrical part with the negative electrode case being placed inside the positive electrode case with their cylindrical parts facing each other with a gasket in between, wherein the cylindrical part of the negative electrode case has its open edge folded outwardly to form U shaped section and its cylindrical part expanded outwardly, so that the inner volume of the negative electrode case is enlarged and the electrical capacity is improved with decreased self-discharge and electrolyte leakage.

18 Claims, 3 Drawing Sheets

FLAT-TYPE CELL

FIELD OF THE INVENTION

The present invention relates to a flat-type cell such as a button-type or coin-type cell, especially to the housing of a zinc-air system flat-type alkaline cell.

BACKGROUND OF THE INVENTION

Cells of various shapes and sizes are used in battery systems for many electronic apparatus. There is a desire to make the size smaller, the weight lighter or the operating time longer, with a higher capacity of the cells.

For the cells limited in size by international standards, an effective means to make the capacity high is to have the inner volume enlarged with wasted space reduced to increase the active materials for the positive and negative electrodes. On the other hand, cells must have high reliability, durability, and be leak-proof in severe circumstances including very high or low temperature, in which the electronic watches, clocks or semiconductor memories are used.

FIGS. 6, 7, and 8, show a prior art zinc-air alkaline button-type cell for hearing aid. The cell comprises a cup-shaped negative electrode case 31, having therein a negative electrode 34 consisting mainly of amalgamated zinc powder. The negative electrode case 31 is surrounded by a cup-shaped positive electrode case 33 of nickel-plated steel sheet, with a generally L-shaped insulating gasket 32 of polyamide resin in between. The open edge of the positive electrode case 33 is bent inward to press the gasket 32 to the negative electrode case 31 to finish the sealed housing. Usually, the negative electrode case 31 is formed of clad or plated sheet with stainless steel 31c as the core, and a copper layer 31e to contact with the negative electrode inside the cell and a nickel layer 31d to function as the negative electrode terminal as shown in FIG. 7. The flat bottom of the positive electrode case 33 has one to three air-holes covered by a diffusion paper 36 on the inside surface. The diffusion paper 36 is porous and enables the oxygen, which is the positive active material, to diffuse uniformly from the atmosphere to the positive electrode 37 through a hydrophobic membrane 38. Stacked on the diffusion paper 36 are a hydrophobic membrane 38, the positive electrode 37, and a separator 39, each being a disc with the same diameter as the inside diameter of the positive electrode case 33. The positive electrode 37, generally called an air electrode, is prepared by mixing a catalyst consisting of manganese oxide and activated carbon, and electroconducting acetylene black, with further addition of polytetrafluorethylene (PTFE) dispersion, applying the mixture on a metallic screen, and drying. The separator 39 consists of a microporous polypropylene (PP) membrane and an electrolyte-absorbing sheet.

When the cell is sealed, the circumference of the stacked hydrophobic membrane 38, positive electrode 37 and separator 39 are pressed to the inside bottom of positive electrode case 33 with the bottom part of the gasket 32 in between, to prevent leakage. This structure, with a large volume in the negative electrode case 31, is suitable for high capacity. However, its leak-proof properties were not satisfactory, because use of strong seal-pressure for sufficient leak-proof properties forced the side wall of the negative electrode case 31 with its sharp under-edge 31a into the upper surface of the gasket 32 often cutting it to destroy electrical insulation. In the past, the zinc-air cells air holes 35 have been closed with an air-tight sealing tape to prevent deterioration of the cell by drying up or invasion of moisture from the atmosphere. For example, a zinc-air alkaline button cell of type R44 (11.6 mm diameter, 5.4 mm overall height) had a capacity 2.1 times compared with the mercury cell of the same size, but was not always reliable due to its low leak-resistance and poor storability. To improve the leak-proof properties, a sealant 30 of polyethylene sulfonide or butyl rubber was placed between the negative electrode case 31 and the gasket 32, as shown in FIG. 7, but without much success.

Referring to FIG. 8, a more improved type zinc-air alkaline button cell comprises a negative electrode case 41, gasket 42, positive electrode case 43, negative electrode 44, air hole 45, diffusion paper 46, positive electrode 47, hydrophobic membrane 48, and separator 49 of the same materials as the parts in the cells described previously in reference to FIG. 6 and FIG. 7. The cell of FIG. 8 is different from that in FIG. 6 in that the negative electrode case 41 has the side wall folded back to form a round edge 41a. With such a negative electrode case 41, the gasket 42 is not cut from the upper side when the negative electrode case is subjected to high pressure. However, the two-layered side-wall of the negative electrode case 41 resulted in a smaller inside-diameter of the case and smaller inside volume and thus smaller electrical capacity. To cope with such shortcomings and to obtain higher capacity, attempts were made to make the thickness of the negative electrode case 41, gasket 42, and positive electrode case 43 thinner. However, the difficulty of preparing thinner parts and of obtaining sufficient sealing strength presented a limit to this endeavour and the decrease of capacity was not fully recovered.

As for the gasket with an L-shaped section, it functions in the assembly of a cell by surrounding the side wall of the negative electrode case with a sealant in between the negative electrode case and the positive electrode case. The gasket of polyamide resin, which is used in most of the flat-type cells especially those including alkaline electrolyte, is apt to change its form and size, by absorbing moisture. Therefore, usually, the negative electrode case and the polyamide resin gasket are assembled to form one body by drying and quick application during assembly of the cell. If not, the gasket is deformed due to moisture absorption thus generating a gap between the upper surface of the gasket and the lower end of the negative electrode case wall. If a cell is sealed with a negative electrode case in this condition, the air in the gap between the negative electrode case and the gasket is forced to contact the electrolyte sealed between the positive electrode and the negative electrode, to cause deterioration in the leak-proof characteristic of the cell.

It is a goal of the present invention to provide a flat-type cell which has a negative electrode case with a large inside volume, and is highly leak-proof, reliable and of high capacity.

SUMMARY OF THE INVENTION

The present invention provides a flat-type cell with improved housing and high capacity.

A flat-type cell according to the present invention comprises a negative electrode case and a positive electrode case each having a cup shape with an insulating gasket in between. A housing containing an electrolyte is formed by bending the flange of the opening of the positive electrode inwards to press and seal the positive electrode and a negative electrode separated by a separator. The cell is characterized in that the negative electrode case has an opening edge folded outwards to create a U formed section, with the cylindrical part of the negative electrode case expanded outwardly to have a larger inside diameter than the folded edge part, in order to attain sufficient leak-proof characteristics and improved capacity.

DETAILED DESCRIPTION OF THE INVENTION

Embodiment 1

Figure 1:
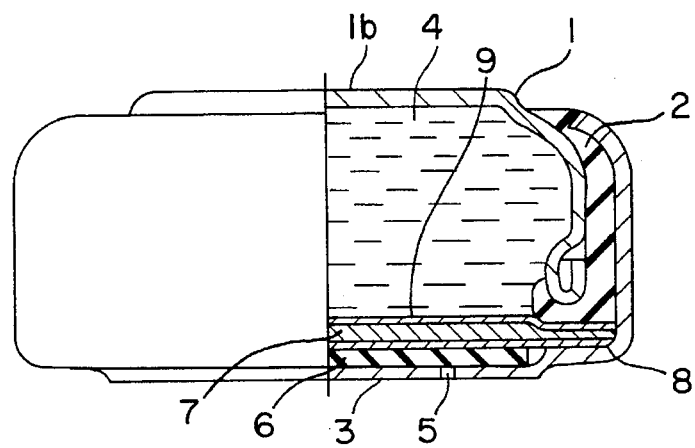
FIG. 1 is a partial cross-sectional view of a zinc-air alkaline flat-type cell according to the present invention.
Figure 2A:
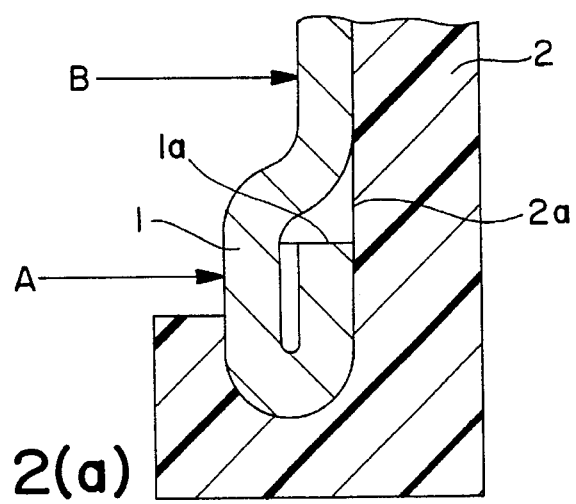
FIG. 2a is one example of an enlarged fragmentary sectional view of a portion of the negative electrode case and gasket of a flat-type cell according to the present invention.

Referring to FIG. 1 and FIG. 2a, a negative electrode case 1 consisting of a three-layered clad or plated sheet of a stainless steel with an inside copper and an outside nickel layer has its edge of the side wall folded out to form a U shape. This is similar to the same part of the conventional cell, except that the wall of the case itself is formed so as to have the major portion expanded outwardly. This structure is the important point of the present invention. Ideally, the outside diameter of the expanded wall is to be the same as the outside diameter of the folded edge. This results in the largest inside diameter B and the largest volume for the case 1. The outside portion or extreme part 1a of the folded edge is formed to be flat. Included in the negative electrode case 1 is a negative electrode 4 consisting of a mixture of amalgamated zinc powder and electrolyte-holding material such as carboxymethylcellulose (CMC) and an alkaline electrolyte absorbed thereinto, the electrolyte consisting mainly of potassium hydroxide. Into the copper layer inside the negative electrode 1 mercury is diffused from the amalgamated zinc powder to form an amalgamation layer resulting in the same electric potential as the amalgamated zinc powder without formation of a local cell. Therefore, the corrosion of zinc, the negative active material, is suppressed and the self discharge, hydrogen generation and electrolyte leakage are prevented. A positive electrode case 3 of nickel-plated steel having air holes 5 is provided, on the bottom of the cell, with a diffusion paper 6, a hydrophobic membrane 8, a positive electrode 7, and a separator 9 in that order, the membrane 8, positive electrode 7 and separator 9 having the same diameter as the inside diameter of the cylindrical part of the case 3. A negative electrode case 1 having the outside of the wall part thereof covered with a sealant layer such as blown asphalt is fixed in the L-shaped section of gasket 2 and dried, and put into the case 3, then the flange of the positive electrode case 3 is bent inwards compressing the gasket 2 between it and the case 1 as well as positioning separator 9, positive electrode 7, and hydrophobic membrane 8 to seal and complete the cell.

Figure 4:
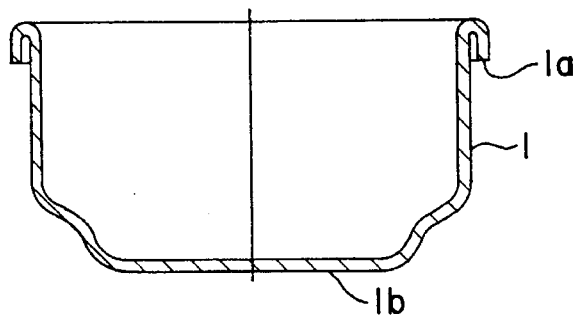
FIG. 4 is a section of a negative electrode case of a button-type cell before the last pressing according to the present invention.

A method of preparing negative electrode case 1 by pressing is explained below. Referring to FIG. 4, showing a section of the case before the last step of the pressing, the case 1 having the edge of the opening folded outwards to form the U shaped section with its extreme edge 1a being a narrow horizontal plane, similarly to one prepared by a conventional transfer machine.

Figure 5:
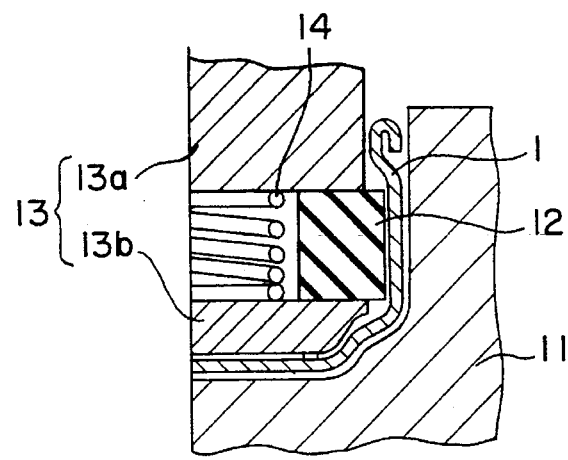
FIG. 5 is a fragmentary sectional view of a press machine head with a negative electrode case therein at the last stage of pressing.

Referring to FIG. 5, the case 1 of FIG. 4 is put in a mold comprising an outer mold 11 and an inner mold 13 consisting of an upper mold 13a and lower mold 13b and an elastic cylinder 12 and a coil spring 14 in between. The elastic cylinder is made of a material having good restoration after pressing such as urethane rubber. When the inner mold 13 is pushed from the upper side, the cylinder 12 is deformed outwardly to push the cylindrical part of the case 1 to the inside wall of the outer mold 11. If the pushing force for the inner mold 13 from the upper side is removed, the coil spring 14 pushes the upper mold 13a back to its original position, the diameter elastic cylinder 12 is reduced, and the inner mold 13 as well as the case 1 can be taken out of the mold.

Figure 6:
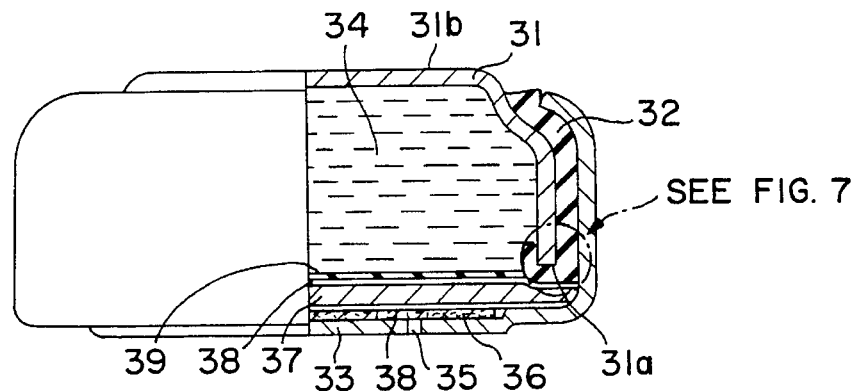
FIG. 6 is a partial cross-sectional view of a zinc-air alkaline button cell according to the prior art.
Figure 7:
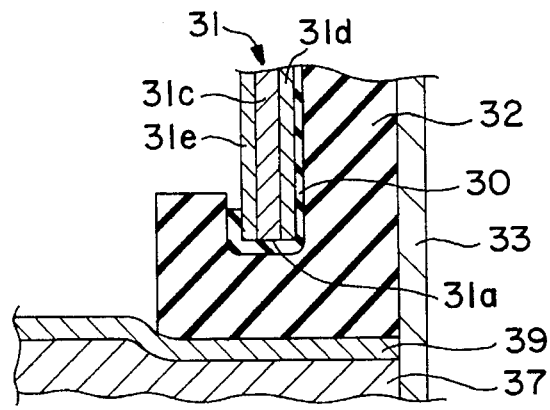
FIG. 7 is an enlarged fragmentary view of the portion identified as S in FIG. 6.
Figure 8:
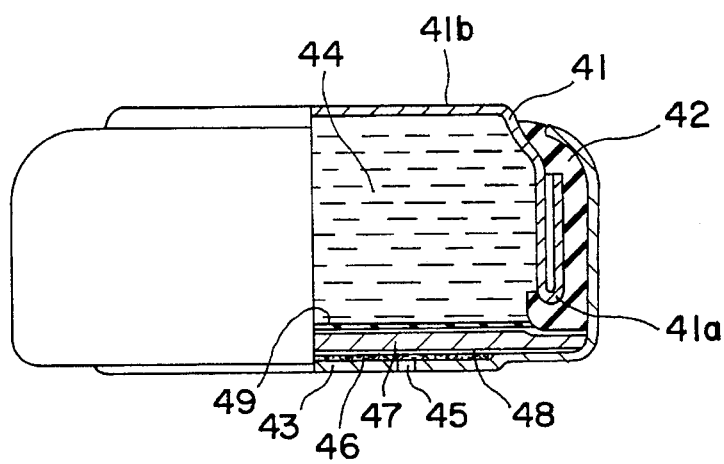
FIG. 8 is a partial cross-sectional view of another example of the zinc-air alkaline button cell according to the prior art.

Three types of R44 size zinc-air alkaline button cells were been prepared and tested for discharge capacity and leakage by an accelerating method; Cells A according to the present invention shown in FIG. 1, cells B were made according to the prior art as shown in FIG. 6, and cells C were made with some improvements shown in FIG. 8. The results are shown in Table 1 below.

TABLE 1

| Cell | Discharge Capacity | Leakage Generation |
|---|---|---|
| A (Present Invention) | 613 mAh | 0% |
| B (Conventional, old) | 619 mAh | 65% |
| C (Conventional, improved) | 580 mAh | 0% |

In the Table, the discharge capacities were obtained by continuously discharging down to 0.9 V with 620Ω constant resistance loads at 20° C. and are shown by the average values for 10 samples each. For the leakage test, 20 samples of each kind were prepared and, with their air holes closed by sealing tape on the bottom of the positive electrode case, preserved four weeks within an atmosphere of 45° C. and 90% relative humidity, and checked for leakage.

As is shown in Table 1, the A cells of the present invention with the folded back U shaped formed section have superior leak-proof with the same capacity as those of the conventional cells.

Embodiment 2

Figure 2B:
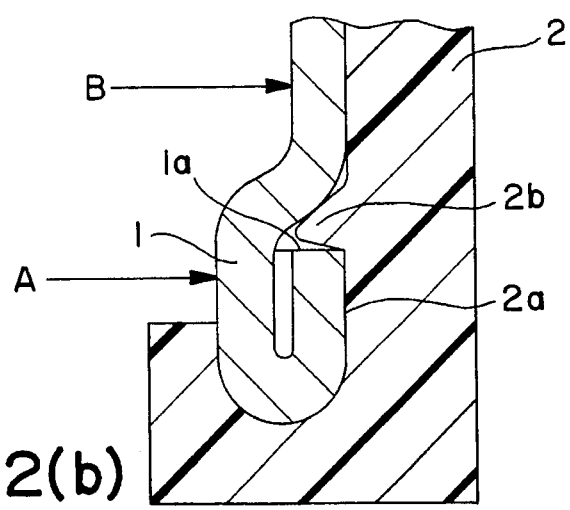
FIG. 2b is another example of enlarged fragmentary sectional view of a portion of the negative electrode case and gasket of a flat-type cell according to the present invention.
Figure 3:
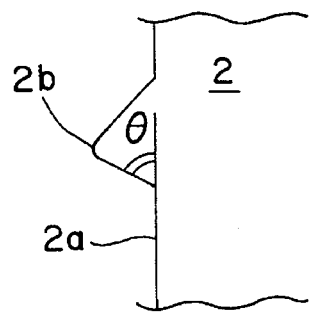
FIG. 3 shows an enlarged fragmentary view of a circular projection formed on the inside wall of the gasket of a flat-type cell shown in FIG. 2b.

Referring to FIG. 2b, the gasket 2 of the another embodiment of the invention has a circular projection 2b a of triangular cross-section to occupy the small space formed between the curved part of the outside surface of the cylindrical part of the negative electrode case 1 and the extreme edge 1a of the outward folded edge thereof. With this structure, leakage can be further avoided if the gasket 2 of polyamide resin, for example fixed outside the case 1 with sealant thereupon (not shown in the figure), is deformed by humidity or such, causing the case 1 to move upward resulting in creation of a gap at the lowest edge of the case 1 adjacent to the surface of the bottom of the gasket. Using the type of cells with no projection inside the gasket as shown in FIG. 2(a) for comparison, five kinds of experimental cells were prepared with the angle θ (FIG. 3) on the underside of the circular projections 2b of the gaskets formed with the inside walls of 3°, 15°, 45°, 75°, and 90°, with the gaskets fixed to the negative electrode case with sealant layers in between. Of each of the above five kinds, a hundred samples were dried first and then preserved for 16 hr under a normal temperature, and the distance of the upper surface of the negative electrode (that is, the terminal surface) from the bottom surface of the gasket was measured before and after the 16 hr. preservation test. If the distance did not change from that measured prior to the test, then the sample was judged to be a good one.

The results are shown in Table 2.

TABLE 2

|  | Angle of the Projection | | | | | Comparison |
| --- | --- | --- | --- | --- | --- | --- |
|  | 90° | 75° | 45° | 15° | 3° | No projection |
| Number of no good samples/100 | 0/100 | 0/100 | 0/100 | 0/100 | 7/100 | 21/100 |

Further, using the above gasket samples, R44 size cells were assembled, and, 20 samples thereof with the air holes closed by sealing tape were tested for leakage accelerated under conditions of 60° C. and 90% relative humidity. The number of failed cells for each category of preservation time are shown as a number/20, e.g. 0/20 are shown in Table 3.

TABLE 3

| Angle of | Preservation time (hrs.) | | | |
| --- | --- | --- | --- | --- |
| the projection | 250 | 500 | 750 | 1000 |
| 90° | 0/20 | 0/20 | 0/20 | 0/20 |
| 75° | 0/20 | 0/20 | 0/20 | 3/20 |
| 45° | 0/20 | 0/20 | 0/20 | 2/20 |
| 15° | 0/20 | 0/20 | 0/20 | 5/20 |
| 3° | 0/20 | 0/20 | 3/20 | 14/20 |
| 0° | 0/20 | 0/20 | 5/20 | 17/20 |

In passing, 250 hrs preservation under the above conditions, this corresponds to one year under conditions of normal temperature and humidity.

From Table 2 and Table 3, it follows that angle θ of the projection should be between 15° and 90° to insure good leak-proof characteristics.

The projection of triangular section 2b is not necessarily continuously circular, but discontinuous projections arranged circularly can also have the same effect.

Also, instead of the above method used to assemble the negative electrode case and the gasket with the sealant in between by simple mechanical force, an injection molding method can be used after the deposition of the sealant and is the preferable method.

Embodiment 3

Usually, the negative electrode case of the cell was made by pressing three-layered clad or plated stainless steel sheet having an outside nickel and inside copper layers. In the course of the pressing metal powder or lubricating oil sticks to the negative electrode case thus formed, and, the electrode case is washed with a solvent or detergent. In preparing the negative electrode case according to the above explained embodiment, the main part of the cylinder, expanded outwardly to have a larger diameter than the folded edge part, sometimes having its inside surface scratched or cracked thus exposing the stainless steel core which, not being amalgamated, forms a local cell with the amalgamated zinc powder of the negative electrode, thus causing the active material zinc to dissolve, generating hydrogen gas, and not only thus self-discharging, but also resulting in increased internal pressure and leakage of electrolyte through the air holes.

To cope with this situation, an attempt was made to plate the inside of the negative electrode case with tin after the washing. Tin plating can be easily done using the electroless process, in which the tin is deposited on the inside copper layer, but not on the outside nickel layer. A typical tin plating solution is an aqueous solution including 2 wt % of stannous chloride, 5 wt % of tartaric acid, and 5 wt % of thiourea. Plating is effected by rotating a basket including a negative electrode case in the plating solution at 30° to 40° C. A thickness of, 0.01 to 0.5 μm, preferably 0.01 to 0.3 μm for the plating is sufficient. Thus, by tin plating a scratch or crack inside the negative electrode case is covered by the tin layer.

Five R44 size zinc-air alkaline button cells with the negative electrode case tin-plated inside designated D as well as five R44 size cells without tin-plating designated E were prepared, and the discharge capacities were measured after 20 days preservation at 60° C. with sealing tape covering the air holes, the discharge being made continuously with 620Ω constant resistance load down to 0.9 V. The results are shown in Table 4.

TABLE 4

|  | Discharge Capacity (mAh) | |
| --- | --- | --- |
| Cell | Just after cell preparation | After 20 days preservation |
| D | av. 630 min. 619 | av. 627 min. 618 |
| E | av. 613 min. 588 | av. 573 min. 511 |

Further, 80 cells each of the D and E type were preserved for 20 days with the air holes closed by sealing tape in an atmosphere of 60° C. and 90% relative humidity, and the leakage checked. The number of the leaking cells are shown in Table 5.

TABLE 5

| Cell | Cells suffered leakage | |
|---|---|---|
|  | Just after cell preparation | After 20 days Preservation |
| D | 0 | 0 |
| E | 0 | 3 |

As is observed in Table 4 and Table 5, the D type cell with the negative electrode case tin-plated inside has self-discharge suppressed, capacity deterioration reduced and leakproof characteristics improved.

The above explanation was made for the zinc-air cell. But, of course, in any other flat-type alkaline cells with a zinc negative electrode active material, the same effect can be expected.

The above explanation refers to the zinc-air alkaline button cell, however, the present invention is not confined to zinc-air cells. The present invention is related to the housing of any flat-type cell typically of button or coin type, and is applicable not only to other alkaline cells but also to various lithium cells. Also, the shape of the cells is not limited to a disc type but may be other shapes; oval or rectangular with round corners.

What is claimed is:

1. A flat-type cell comprising:
   a cup-shaped negative electrode case and a cup-shaped positive electrode case with an insulating gasket in between forming a sealed housing by bending an open edge of said positive electrode case inwardly to, said positive electrode case and said negative electrode case separated by a separator with an electrolyte held between said electrode cases,
   wherein, said negative electrode case has an opening edge folded outwardly to form U shaped section, with a cylindrical part expanded outwardly to have an inner diameter larger than the inner diameter of the folded part.

2. A flat-type cell according to claim 1, wherein said gasket has an inside wall containing a projection to fit into the space which is formed by the extreme part of the folded open edge and an outer surface of the cylindrical part of the negative electrode case.

3. A flat-type cell according to claim 1, wherein the cup-shaped negative electrode case having a folded edge and expanded cylinder is provided with a gasket by injection molding.

4. A flat-type cell according to claim 2, wherein said projection is of triangular shape section and the angle the under side of the projection formed with the base of the triangle is from 15° to 90°.

5. A flat-type cell according to claim 1, wherein a sealant layer is formed between the gasket and the negative electrode case and between the gasket and the positive electrode case.

6. A flat-type cell according to claim 2, wherein a sealant layer is formed between the gasket and the negative electrode case and between the gasket and the positive electrode case.

7. A flat-type cell according to claim 3, wherein a sealant layer is formed between the gasket and the negative electrode case and between the gasket and the positive electrode case.

8. A flat-type cell according to claim 4, wherein a sealant layer is formed between the gasket and the negative electrode case and between the gasket and the positive electrode case.

9. A flat-type cell comprising:
   a cup-shaped negative electrode case and a cup-shaped positive electrode case together with an insulating gasket in between forming a sealed housing by bending the open edge of said positive electrode case inwardly;
   a negative electrode in the negative electrode case comprising zinc powder holding alkaline electrolyte;
   a sheet of diffusion paper, hydrophobic membrane, and an air-electrode stacked on the bottom of said positive electrode case, with a separator to separate the both electrodes;
   wherein said negative electrode case has its open edge folded outwardly to form U shaped section, with a cylindrical part expanded outwardly to have its inner diameter larger than the inner diameter of the folded part.

10. A flat-type cell according to claim 9, wherein the inside wall of the negative electrode case is covered with a tin layer.

11. A flat-type cell according to claim 9, wherein said gasket has on an inside wall a projection to fit into the space which is formed by the extreme part of the folded opening edge and the outer surface of the cylindrical part of the negative electrode case.

12. A flat-type cell according to claim 9, wherein the cup-shaped negative electrode case having folded edge and expanded cylindrical wall is provided with a gasket by injection molding.

13. A flat-type cell according to claim 9, wherein said projection is of triangular shape section and the angle the under side of the projection forms with the base of the triangle is from 15° to 90°.

14. A flat-type cell according to claim 9, wherein a sealant layer is deposited between the gasket and the negative electrode case and between the gasket and the positive electrode case.

15. A flat-type cell according to claim 10, wherein a sealant layer is deposited between the gasket and the negative electrode case and between the gasket and the positive electrode case.

16. A flat-type cell according to claim 11, wherein a sealant layer is deposited between the gasket and the negative electrode case and between the gasket and the positive electrode case.

17. A flat-type cell according to claim 12, wherein a sealant layer is deposited between the gasket and the negative electrode case and between the gasket and the positive electrode case.

18. A flat-type cell according to claim 13, wherein a sealant layer is deposited between the gasket and the negative electrode case and between the gasket and the positive electrode case.

* * * * *

UNITED STATES PATENT AND TRADEMARK OFFICE
CERTIFICATE OF CORRECTION

PATENT NO. : 5,576,117
DATED : November 19, 1996
INVENTOR(S) : Morita et al.

It is certified that error appears in the above-indentified patent and that said Letters Patent is hereby corrected as shown below:

On the cover page, item [57] Abstract, line 7, after the word "form" insert the word --a--.

On the cover page, item [57] Abstract, line 7, between the words "U" and "shaped" insert a hyphen "-".

On the cover page, item [57] Abstract, line 7, between the words "part" and "expanded" insert the word --is--.

Column 7, line 31, delete the word "to".

Column 7, 36, after the word "form" insert the word --a--.

Column 7, line 36, between the words "U" and "shaped" insert a hyphen "-".

Column 7, line 50, the word "shape" should be --shaped--.

Column 7, line 50, before the word "section" insert the word --cross--.

Column 7, line 51, the word "formed" should be --forms--.

Column 8, line 11, delete the word "the" and insert --an--.

UNITED STATES PATENT AND TRADEMARK OFFICE
CERTIFICATE OF CORRECTION

PATENT NO. : 5,576,117
DATED : November 19, 1996
INVENTOR(S) : Morita et al.

It is certified that error appears in the above-indentified patent and that said Letters Patent is hereby corrected as shown below:

Column 8, line 20, after the word "form" insert --a--.

Column 8, line 20, between the words "U" and "shaped insert a hyhpen "-".

Column 8, line 30, the word "opening" should be --open--.

Column 8, line 34, between the words "having" and "folded" insert --a--.

Column 8, line 38, the word "shape" should be --shaped--.

Column 8, line 38, before the word "section" insert the word --cross--

Signed and Sealed this

Fifteenth Day of April, 1997

BRUCE LEHMAN

*Attest:*

*Attesting Officer*   Commissioner of Patents and Trademarks

UNITED STATES PATENT AND TRADEMARK OFFICE
CERTIFICATE OF CORRECTION

PATENT NO.   : 5,576,117
DATED        : November 19, 1996
INVENTOR(S)  : Morita et al.

It is certified that error appears in the above-identified patent and that said Letters Patent is hereby corrected as shown below:

<u>Column 8,</u>
Line 20, after the word "form" insert -- a --.
Line 20, between the words "U" and "shaped insert a hyphen "-".
Line 30, the word "opening" should be -- open --.
Line 34, between the words "having" and "folded" insert -- a --.
Line 38, the word "shape" should be -- shaped --.
Line 38, before the word "section" insert the word -- cross --.

Signed and Sealed this

Twenty-second Day of July, 2003

JAMES E. ROGAN
*Director of the United States Patent and Trademark Office*